Dec. 11, 1923.

S. K. DENNIS 1,477,323

LAND PACKER

Filed April 7. 1921

Inventor:-
Samuel K. Dennis,
By H.P. Doolittle
Atty.

Patented Dec. 11, 1923.

1,477,323

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

LAND PACKER.

Application filed April 7, 1921. Serial No. 459,272.

*To all whom it may concern:*

Be it known that I, SAMUEL K. DENNIS, a citizen of the United States, residing at Chicago, in the county of Cook and State of Illinois, have invented certain new and useful Improvements in Land Packers, of which the following is a full, clear, and exact specification.

My invention relates to land rollers of the type known as sub-soil packers or cultivating packers, and the object of the invention is to improve the crushing and leveling action of machines of this character employing a succession of two or more parallel rollers or equivalent ground working tools, and I accomplish this purpose by constructing such a machine with a novel form of rocking joint between the upper frame and the roller carrying frame consisting of a pair of seats on the upper frame spaced in a fore and aft direction and engaging the roller frame at points equally spaced from its center so that the roller frame when passing over uneven ground will cause the weight of the upper frame to be thrown first on the forward bearing and then on the rear bearing as the front and rear rollers pass over a rise in the soil.

With this main and other incidental objects in view my invention consists of the organization and details of construction or their equivalents, described in the following specification and defined in the claims.

Referring to the drawings—

In the present instance I illustrate my invention as embodied in a packing and cultivating roller employing a pair of parallel front and rear rollers 5 and 6, these rollers being preferably of equal diameter and made up of separate disks of well known form which are clamped together on shafts journaled in the ends of the links 7. These shafts are preferably journaled in the links so as to be readily removable from the bearings or movable longitudinally therethru to enable one or more of the disks comprising each roller to be removed and the arrangement of the disks on the shaft varied as desired, and for this purpose I provide a removable bearing-cap 13. The particular form of roller used and journal bearing employed do not form part of my present invention and it should be understood that any equivalent form of clod crushing tool or bearing may be substituted.

Figure 1:
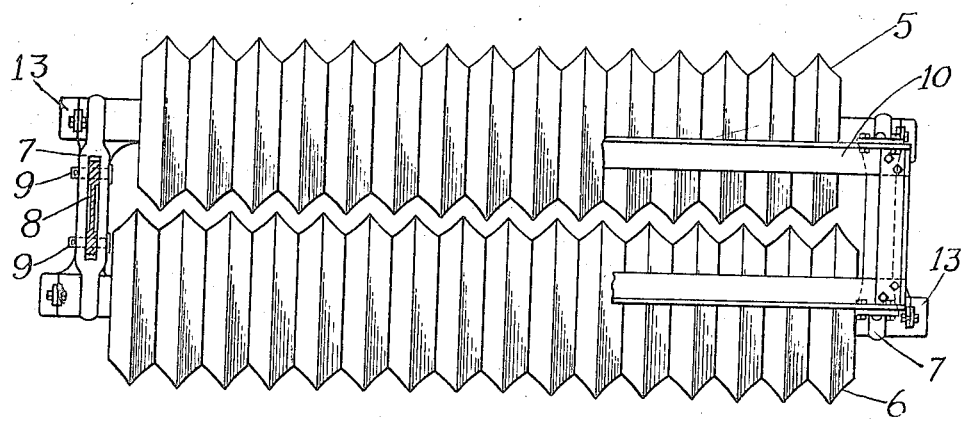
Fig. 1 is a plan view, with parts broken away, of a land roller embodying my invention.
Figure 4:
Fig. 4 is a detail view of the lower end of one of the bearing brackets.
Figure 3:
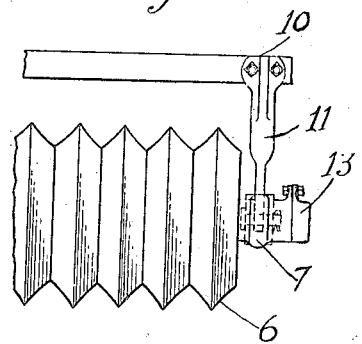
Fig. 3 is a front view of one end of the machine.
Figure 2:
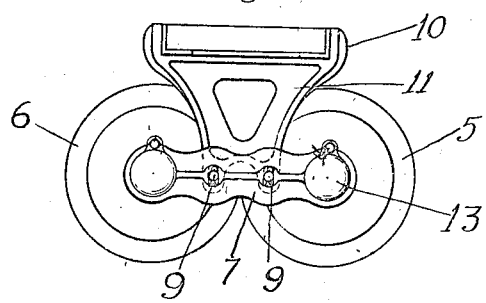
Fig. 2 is an end view.

The links 7 in which the roller shafts are journaled are preferably straight and each link is formed with the vertically extending longitudinal slot 8 which is bridged near either end and at equal distances from the center of the link by bearing pins 9 which are retained in place by cotter pins or similar means these pins 9 being approximately in the same horizontal plane as the axes of the roller shafts. Positioned above the roller frame there is an upper or weight frame 10 to which the draft tongue is attached and which is preferably constructed of angle bars placed with one flange extending in a horizontal direction to permit a bottom closure to be placed thereon and the frame used as a weight box if desired. At either end, this frame is provided with depending brackets 11 which terminate in a pair of spaced seats 12 such as the slots shown in Figure 4, these seats resting on both pins 9 when the rollers are traveling on an even surface. With this construction it will be evident that the point of connection between the frames is low down on the roller frame and well within the plane in which the rollers lie and that the lower or roller frame can rock on the upper frame on either pin 9 and it results, therefore, that as the forward roller passes over a rise or obstruction, such as clods on the ground the upper or weight frame will be raised on the front bearing and the weight of the frame thrown principally on the forward roller, the action being repeated and the frame raised on the rear bearing when the rear roller passes over the obstruction, with the result that practically the whole weight of the upper frame is twice applied to leveling the ground, greatly increasing the efficiency of this type of machine.

While the construction here described exemplifies one form which my invention may take, it is not to be regarded as limited thereto and various modes of connecting the upper and lower frames so that the weight of the upper frame is shifted from front to rear as described could be substituted within the scope of the following claims.

I claim as my invention:

1. In a cultivating implement, the combination of a frame including successive tool carrying shafts, a weight frame above said tool frame, and a connection between the frames permitting them to rock on each other in a fore and aft direction on points of support located in a horizontal plane with the axes of the tool shafts and including means for causing the bearing point of the weight frame on the tool frame to shift in a fore and aft direction as the tool frame is rocked by travel over uneven ground.

2. In a cultivating implement, the combination of a frame including successive tool carrying shafts, a weight frame above said tool frame, and a connection between the frames permitting them to rock on each other in a fore and aft direction on two axes located in a horizontal plane with the axes of the tool shafts and including means causing the axis of pivotal movement to shift from one to the other of said axes as the tool frame is rocked by travel over uneven ground.

3. In a land roller, the combination of a frame comprising successive roller carrying shafts, a frame above said first frame and a rocking joint between the frames including a plurality of transverse bearings located at points within the plane of the rollers and spaced from each other in a fore and aft direction.

4. In a land roller, the combination of a frame comprising successive roller carrying shafts, a frame above said first frame and a rocking joint between the frames including a plurality of transverse pivotal connections spaced from each other in a fore and aft direction and engaging the first frame at points spaced equal distances from the axes of said shafts.

5. In a land roller, the combination of a frame comprising successive roller carrying shafts, a frame above said first frame, and a rocking joint between the frames including a plurality of transverse bearings located at points within the plane of the rollers and spaced from each other in a fore and aft direction, and engaging the first frame at points between the axes of said shafts.

6. In a land roller, the combination of successive roller carrying shafts, links connecting the ends of said shafts, a frame above said shafts and provided with end brackets having front and rear bearing slots and bearing pins on said links spaced equal distances from the middle thereof and received in said slots.

7. In a land roller, the combination of successive roller carrying shafts, links connecting the ends of said shafts, a frame above said shafts and provided with end brackets having front and rear bearing slots and bearing pins on said links received in said slots.

8. In a land roller, the combination of successive roller carrying shafts, links connecting the shafts, a frame above said shafts and provided with brackets having front and rear bearing slots and bearing pins on said links received in said slots.

9. In a land roller, the combination of successive parallel roller carrying shafts, links connecting the shafts, a frame above said shafts and provided with brackets each of which has a pair of seats loosely engaging one of said links.

10. In a land roller, the combination of successive parallel roller carrying shafts, links connecting the shafts, a frame above said shafts and provided with brackets, each of which has a pair of seats loosely engaging one of said links intermediate their connections to the shafts.

11. A land roller comprising a pair of parallel roller carrying shafts, connecting links in which the shafts are journaled, said links being provided with vertically extending slots intermediate the shaft bearings, a pair of spaced bearing elements bridging each of said slots and a frame positioned above the rollers and provided with brackets having seats resting on said bearing elements.

12. A land roller comprising a pair of parallel roller carrying shafts, connecting links in which the ends of the shafts are journaled, a frame above the rollers extending from end to end thereof and having depending end brackets each formed with a pair of spaced seats engaging the links and permitting pivotal movement on either seat.

In testimony whereof I affix my signature.

SAMUEL K. DENNIS.